United States Patent [19]

Mesly

[11] 3,791,897

[45] Feb. 12, 1974

[54] METHOD AND APPARATUS FOR MAKING ENDLESS BELTS

[75] Inventor: Xavier Mesly, Sherbrooke, Quebec, Canada

[73] Assignee: Bombardier Limited, Valcourt, Quebec, Canada

[22] Filed: June 16, 1971

[21] Appl. No.: 153,696

[52] U.S. Cl.............. 156/137, 156/191, 156/396, 156/414, 156/552, 156/567, 221/217, 425/38, 425/47

[51] Int. Cl..... B29h 7/22, B29h 17/04, B29h 17/16

[58] Field of Search... 156/187, 188, 191, 184, 297, 156/300, 301, 303, 396, 414, 544, 552, 553, 564, 565, 124, 138, 111, 137–141, 566–568; 425/38, 47; 221/210, 217, 218, 222, 231, 237

[56] References Cited
UNITED STATES PATENTS

| | | | |
|---|---|---|---|
| 1,380,463 | 6/1921 | Bulley | 425/47 |
| 1,494,075 | 5/1924 | Murray | 156/191 |
| 2,028,078 | 1/1936 | State et al. | 156/396 X |
| 2,456,063 | 12/1948 | James | 425/47 X |
| 3,042,966 | 7/1962 | Laycox | 425/47 X |
| 3,249,483 | 5/1966 | Kauffman et al. | 156/567 X |
| 3,310,301 | 3/1967 | Netta et al. | 221/217 X |
| 3,606,921 | 9/1971 | Grawey | 156/124 X |
| 3,607,561 | 9/1971 | Suchteln | 156/137 |
| 3,659,976 | 5/1972 | Yavorsky et al. | 425/47 X |

Primary Examiner—Alfred L. Leavitt
Assistant Examiner—Basil J. Lewis
Attorney, Agent, or Firm—Larson, Taylor and Hinds

[57] ABSTRACT

The disclosure herein describes an apparatus which consists of a rotatable turret carrying three horizontally extending shafts, each capable of supporting an improved track-receiving drum, of at least two improved vulcanizers mounted adjacent the turret and movable relative thereto, of an automatic rod applicating device adapted to come in circumferential abutment with the track-receiving drum, of a track-extracting device adapted to be inter-connected with the drum, and of heating and cooling stations having conduits for connection with the drum. The disclosure also describes a new method making snowmobile-type tracks in a more efficient and economical way.

20 Claims, 17 Drawing Figures

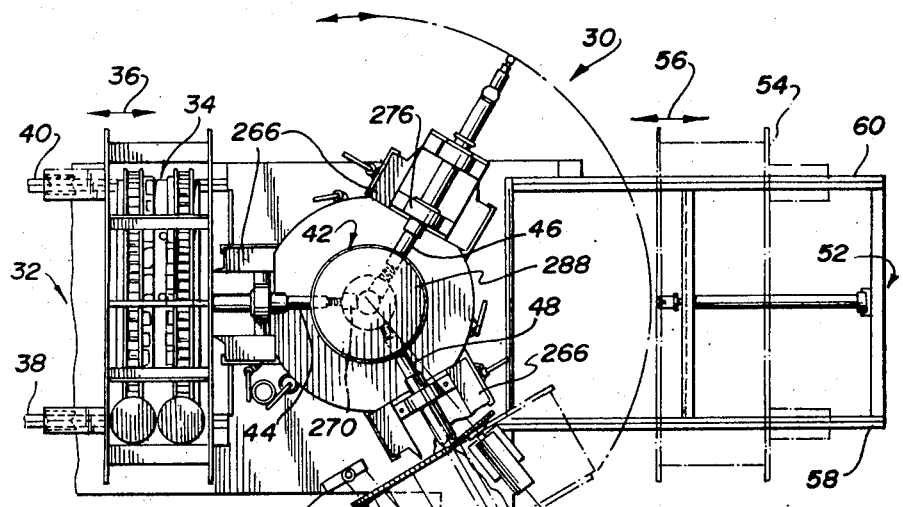
FIG.1.
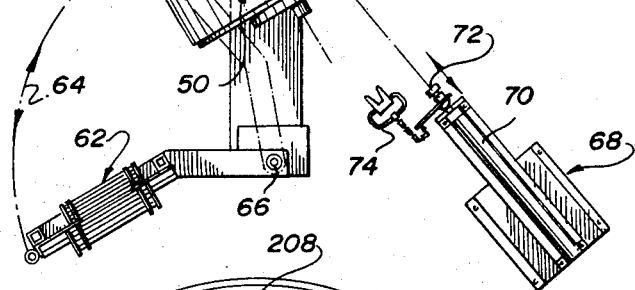
FIG.2.
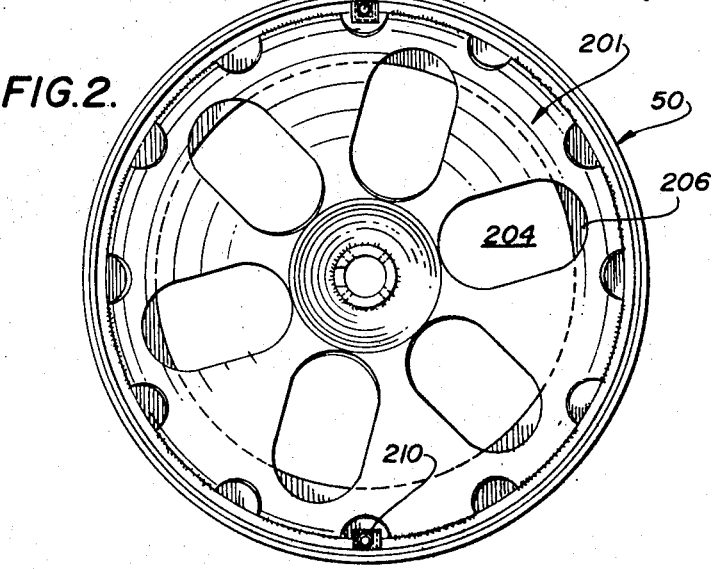

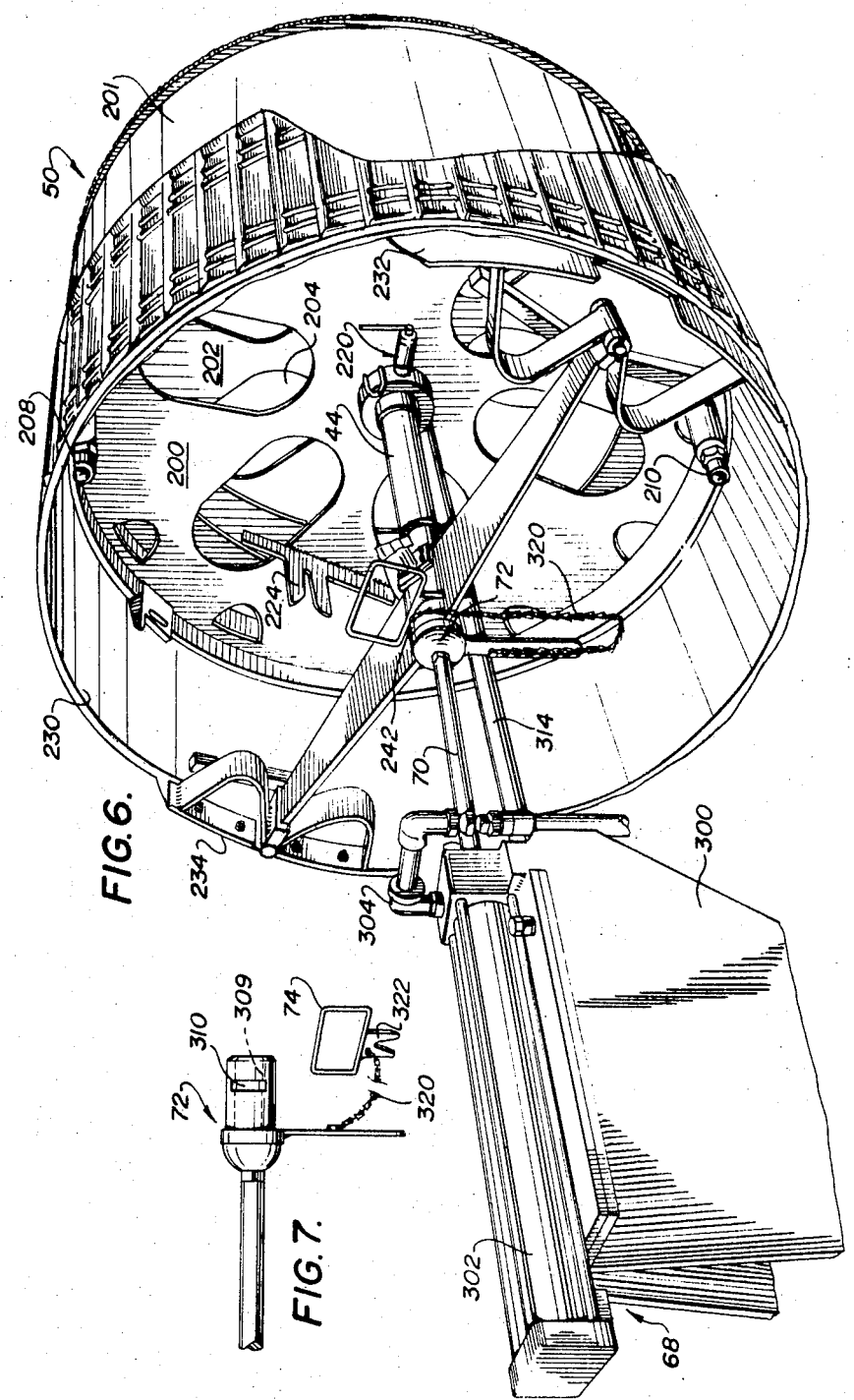

METHOD AND APPARATUS FOR MAKING ENDLESS BELTS

This invention relates to an apparatus for making snowmobile-type endless tracks or belts and to a method for making the same.

Generally, the endless flexible track of a snowmobile is made by initially covering the outer periphery of a forming drum with a first layer of nylon and rubber fabric (also known as "skimmed fabric" or "friction fabric"), manually positioning transversely on the fabric a series of rigid bars or rods at regular intervals and subsequently covering the rods and the fabric with additional layers of rubber with or without fabric; then, the drum is placed in a vulcanizer where the fabric is molded under pressure and heat treated into an endless flexible track, the outside surface of which will bear a tread design imprinted by pressure blocks mounted in the vulcanizer. While the track is being cured, the machine operator removes from another drum a previously cured track, treats the outer surface thereof by removing rubber flashing left along the edges due to mold overflowing during the vulcanization treatment and then covers the same forming drum with fabric and rods to prepare another track.

Prior to the present invention, the drum used in the making of a snowmobile track normally consisted of a hollow cylindrical member, the periphery of which was transversely split; the inner surface of the drum supported hydraulic or pneumatic cylinders which, when actuated, caused an overlapping of the edges at the split to thereby reduce the diameter of the drum, and, thus, the track, once molded and cooled, could be removed off the drum. The vulcanizer most often used consisted of a heavy circular framework supporting a series of circumferentially disposed pressure blocks, each actuated by a pair of hydraulically operated cylinders.

There are a number of disadvantages to this type of apparatus from an operational standpoint. First, since the periphery of the drum is transversely split, the drum is not rigidly circular and, therefore, does not oppose uniformly the radial forces exerted by the pressure blocks during vulcanization. This inevitably results in an uneven thickness throughout the endless molded track which therefore is an unbalanced track. Furthermore, the greater the number of pressure blocks, the more the amount of excess material which overflows the blocks during the vulcanizing process and which must be chipped off afterwards by the machine operator. Another evident time-consuming operation is the manual application of the rods of the nylon and rubber layer when preparing a new track on a drum; this operation takes up four and a half minutes of the operator's time.

There are also other disadvantages from an economical standpoint. The framework which supports the vulcanizer consists of a bulky carcass which must support roughly sixty pressure blocks (corresponding to the number of rods in the track), one hundred and twenty cylinders to actuate these blocks and all their associated parts. Furthermore, a protective coating is normally applied to the metal rods to increase bonding to rubber, and unfortunately, the effectiveness of the bonding coating, such as known under the trademark "Chemlock", is inevitably affected when touched by the operator's hands.

It is an object of this invention to provide an apparatus for making snowmobile-type tracks which will overcome the abovenoted disadvantages. The apparatus of the present invention consists of a set of machinery which includes principally an improved vulcanizer, a mechanical rod applicator and a new drum from which a cured and cooled track may easily be removed.

The vulcanizer of the present invention consists of a series of spaced-apart arc-shaped mold segments which are supported on a movable frame and which are radially movable in circumferential abutment on the fabric-carrying drum by means of hydraulically or otherwise operated chain means. There results a framework which is less bulky than that of the prior art as it is no longer required to take up the reaction of a great number of cylinders. Furthermore, by reducing to preferably seven the number of segments individually applied to the track for curing, there results a time reduction in flashing removal operations. This time reduction combined with the time reduction obtained by the new rod applicator hereinafter described, enable the operator to work with two vulcanizers, instead of one, in the same track curing period (about 25 minutes).

The rod applicator of the present invention consists of a pivotable frame which supports a rod receiving and stacking unit and rotatable rod dispensing means which collect each rod from the stacking unit and transfer it onto the rubber and nylon fabric on the drum. The provision of a novel rod applicator on the apparatus first ensures that the bonding qualities of any protective coating on the rods would not be adversely affected by contact with the operator's hands. Secondly, the rod applicator is so constructed that the step of applying the rods on the fabric is now more quickly and accurately effected (about 24 seconds).

The drum of the apparatus of the present invention consists of a rigid hollow cylindrical frame and of a flexible thin sleeve member which may be slid in and out of circumferential engagement with the outer peripheral surface of the frame; a cured and cooled track may then be easily separated from the sleeve by simple inward flexing of the sleeve. The provision of a drum with a fixed diameter enables the making of a track of uniform thickness; because of this, it is now possible to reduce the average thickness of the track, thus resulting in an appreciable reduction of material and more flexible tracks and also a reduction of curing and cooling time.

The operational and economical advantages obtained by the aforementioned vulcanizer, rod applicator and drum, enable the provision of a new apparatus and method for making snowmobile tracks where the number of tracks performed by one man in a given period of time, can be largely increased in comparison with the number of tracks which were obtained with prior machines.

The new apparatus consists of two vulcanizers which are movable toward and away from a rotatable turret carrying three horizontally extending shafts, each shaft capable of supporting a drum; the apparatus also consists of the abovementioned rod applicator and of a belt extracting device which operates to remove a track-carrying sleeve off the drum after curing and preferably cooling as well. With these components set in a predetermined arrangement, the present invention therefore permits a new method for making snowmobile tracks which consists of having simultaneously two tracks being cured, one track being cooled and one track being prepared.

The invention also provides a method of making snowmobile-type tracks with a pair of vulcanizers movably mounted adjacent a rotatable turret carrying three horizontally extending shafts capable of supporting a track receiving drum, comprising the steps of preparing on a first drum a track constructed of rods and of layers of rubber and nylon fabric, placing said first drum in a vulcanizer and curing said first track; preparing on a second drum a similarly constructed track, placing said track in a second vulcanizer and curing said second track; preparing on a third drum a similarly constructed track; removing said first drum from said first vulcanizer; placing said third drum in said first vulcanizer and curing said third track; placing said first drum adjacent a cooling station and cooling said first track; and preparing on a fourth drum a similarly constructed track.

The above and still further highly important advantages of this invention will become apparent from the following detailed specification and drawings. Referring to the drawings which illustrate the invention and in which like reference numerals indicate like parts throughout the several views;

FIG. 1 is a plan view of the apparatus of the present invention showing the predetermined arrangement of the components of the apparatus;

FIG. 2 is a front view of the drum of the apparatus of the present invention;

FIG. 6 is a perspective view of the belt extracting device and drum of the present apparatus;

FIG. 7 is a side view of the extractor head and key;

Figure 3:
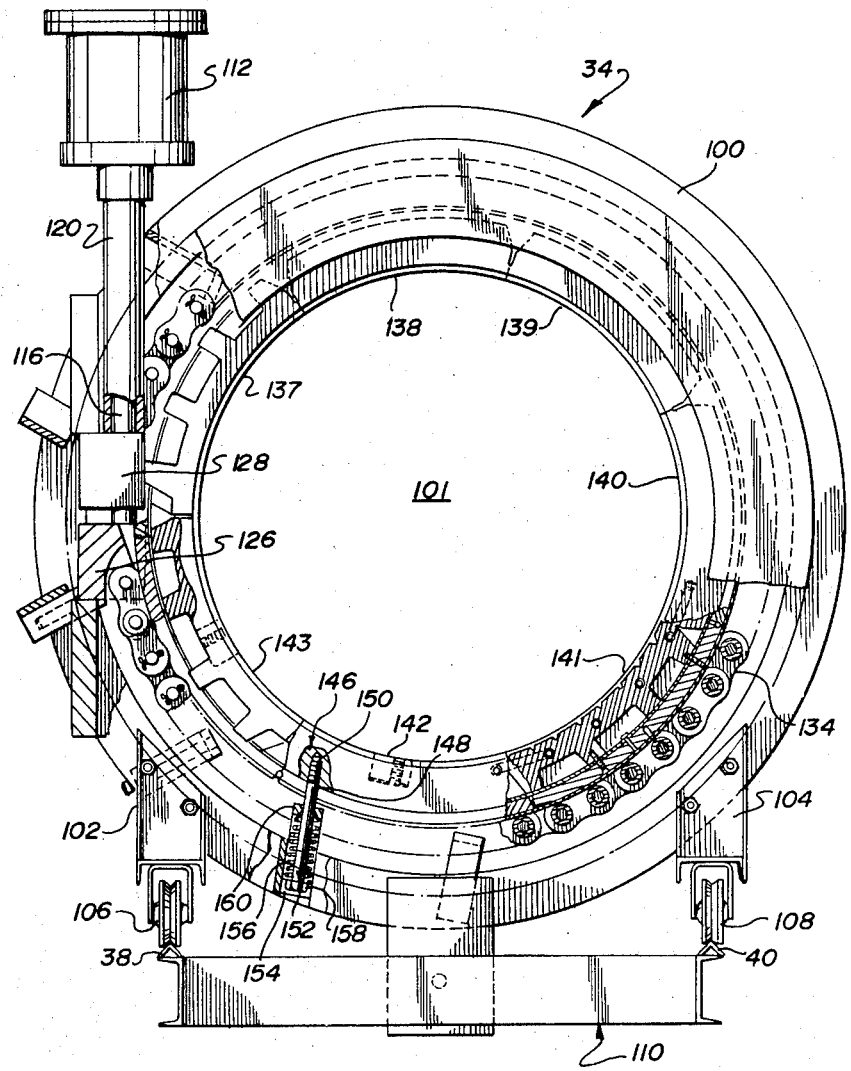
FIG. 3 is a front view, partly cross-sectional, of one of the vulcanizers of the present apparatus.

Referring to FIG. 1 of the drawings, there is shown an apparatus 30 for making snowmobile-type endless flexible tracks which usually consist of a tough rubber fabric, or the like material, molded over a rubber and nylon or skimmed fabric; in most cases, the track is reinforced by a plurality of transversely disposed rods made of spring steel or other suitable rigid resilient material, totally or partially embedded in the fabrics. The rods can be round, oblong, square, rectangular, etc., however, good results have been achieved using round section rods with flat ends. Each track has one or two longitudinal rows of holes and their outer surface is usually provided with a particular tread design to provide maximum traction to the snowmobile since these tracks are the driving means of the snowmobile. Therefore, although the present invention will be described in relation to tracks having a particular construction and design, it is evident that minor alterations may be brought to the apparatus without departing from its scope to suit other types of tracks.

The apparatus 30 shown in FIG. 1 consists of a first station 32 where a first vulcanizer 34 may travel in the directions indicated by arrows 36 on a pair of parallel rails 38 and 40. The vulcanizer 34 is movable away and from a turret 42 which is pivotable about a central axis and which supports three horizontally extending shafts 44, 46 and 48. These shafts are adapted to support a drum, one of which is shown as 50 being supported by shaft 48. On the opposite side of the turret 42, a second station 52 is provided to receive a second vulcanizer 54 shown in phantom lines which is also movable in the direction inicated by arrows 56 on rails 58 and 60. The apparatus 30 further consists of a rod applicating device 62 which is pivotable, as indicated by arrows 64, about pivot 66 in order to come in contact with the drum 50. The apparatus 30 further includes a belt extracting device 68 fixed to the floor and comprising a longitudinally slidable spindle 70, the head portion 72 of which is adapted to come into a locking engagement with the central hub portion 242 of a sleeve member 230 (see FIGS. 4 and 5).

A more detailed description of the structure and operation of each of the components of the apparatus 30 will now be given as well as a description of the method of making a snowmobile track with the use of this apparatus.

Figure 12:
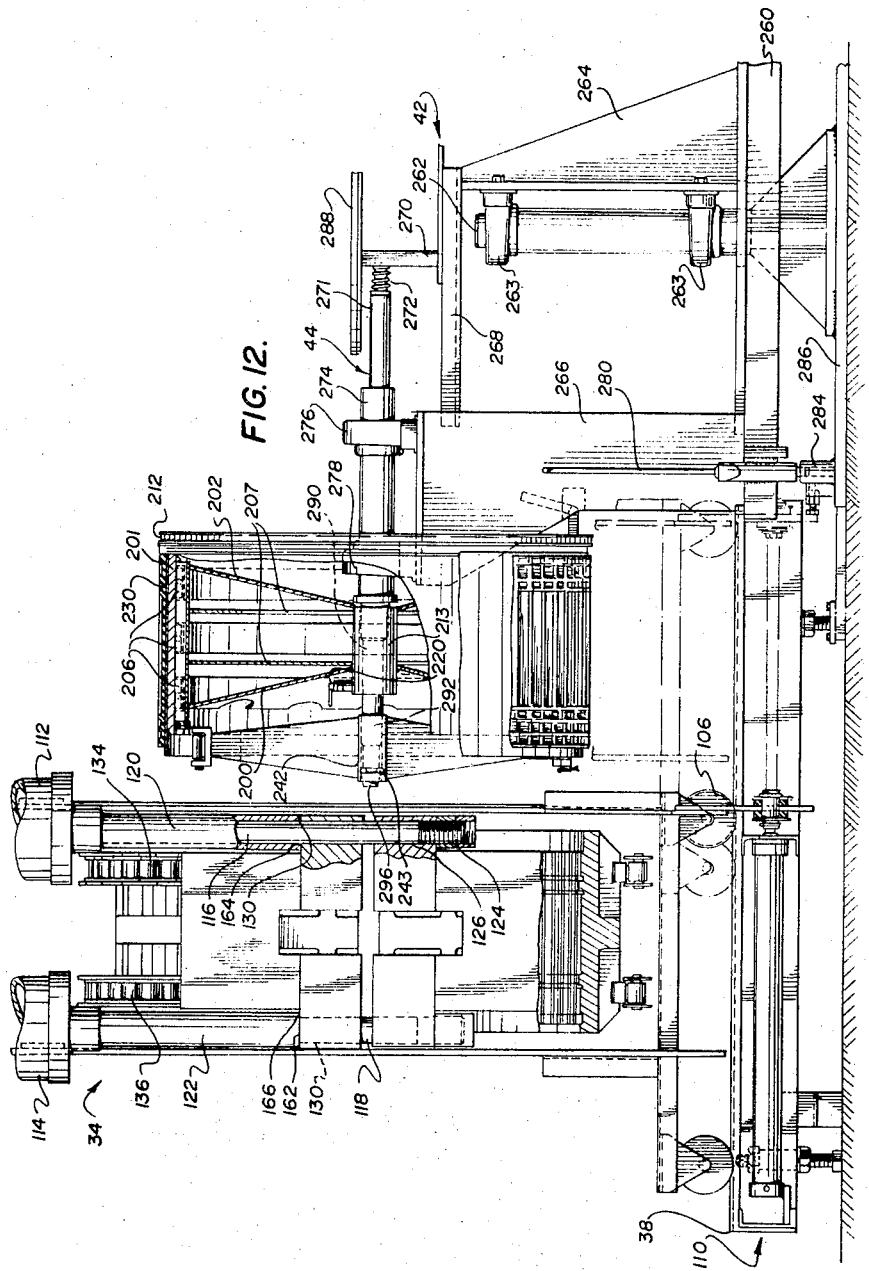
FIG. 12 is a front elevational view of one side of the apparatus showing one vulcanizer partially broken away, one track covered drum partly broken away and one side portion of the turret.
Figure 13:
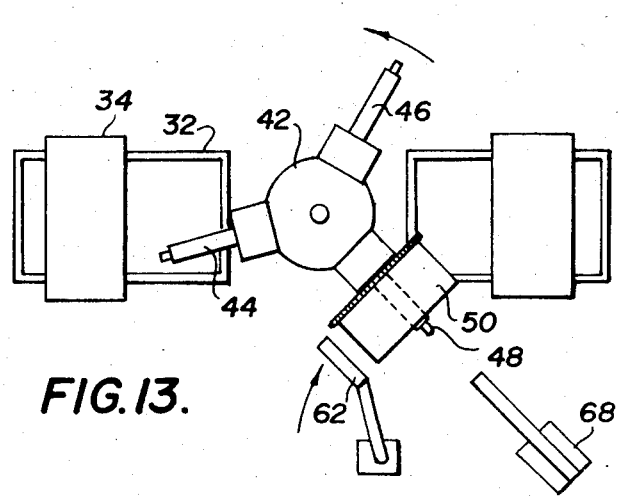
FIGS. 13–17 are schematic layouts of the apparatus showing the sequence of operation for making snowmobile tracks in accordance with the present invention.
Figure 14:
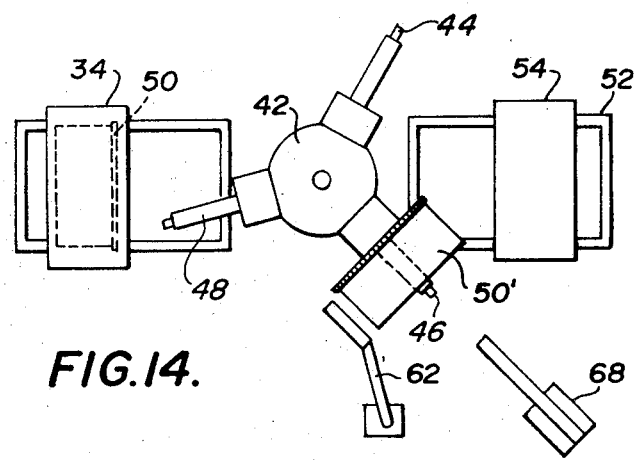
Figure 15:
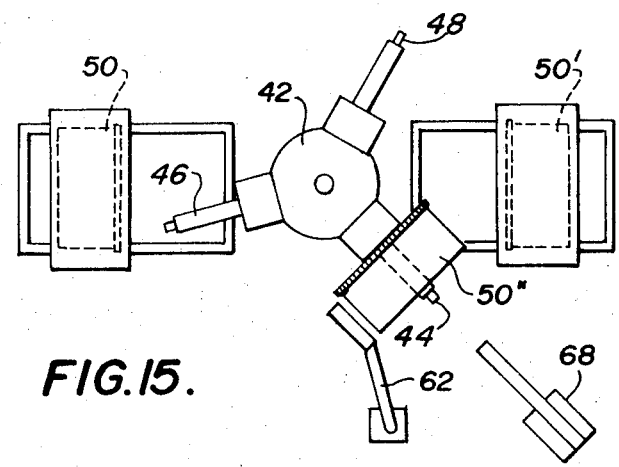
Figure 16:
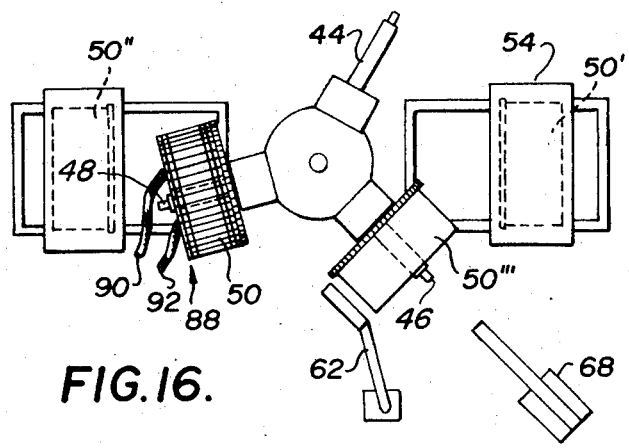
Figure 17:
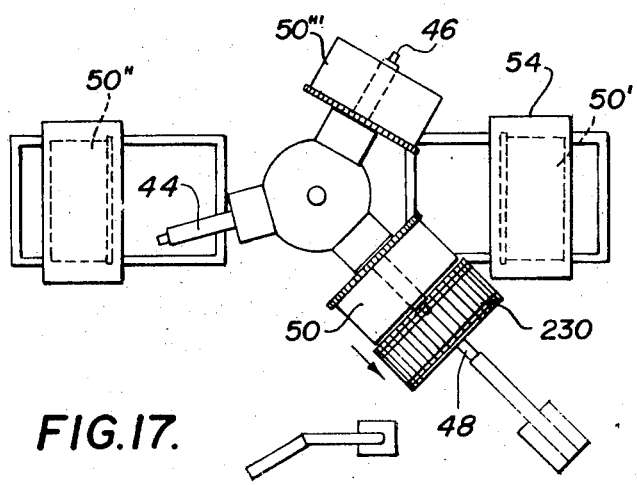

Referring to FIGS. 3 and 12 of the drawings, the vulcanizer 34 includes a ring support or rigid circular frame 100 having an empty space 101 therewithin and having secured at its lower portion a plurality of upstanding leg supports, two of which are shown at 102 and 104 carrying wheels 106 and 108, respectively; the wheels are so shaped as to easily run on a pair of rails 38 and 40 forming part of a base support 110. The frame 100 also supports a pair of hydraulic and air operated cylinders 112 and 114, each respectively capable of actuating piston rods 116, 118 in their corresponding spacer tubes 120, 122. With reference to piston rod 116, for example, shown in FIG. 12, the lower end of the piston has a threaded portion 124 which is engaged in a first movably mounted block 126. A second movably mounted block 128 is vertically spaced above block 126 and has appropriate openings 130 and 132 for the passage of piston rods 116 and 118 therethrough; both blocks 126 and 128 serve to respectively attach the ends of a pair of single strand chains 134 and 136. A series of arc-shaped mold segments 137 to 143 are supported by the frame 100 and are shown disposed in circular contiguity in core 101; the number of these segments may vary (minimum of three, however) and satisfactory results are obtained with seven, as shown in the drawings. Each segment has an inner recessed surface from which the relief surface of the track will be cast. The chains 134 and 136 are laterally spaced apart and encircle the outer surfaces of the segments.

Each chain is fixed at its intermediate portion to segment 140, e.g., the only portion of the chain which is fixed to the mold segments is situated diametrically opposite to its end portions secured in the blocks 126 and 128. Each segment is provided with spring-biased means (one of which is shown at 146) serving to radially and outwardly return the segments into a non-contacting circular alignment. There are usually two of these spring means per segment and each one consists of a rod 148 which has one end 150 threadedly received in the segment and the other end 152 received in a spring box 154 in frame 100; a spring 156 surrounds the rod 148 and is compressed between the nut 158 and the bottom end 160 of the spring box; it is evident that the tension given to these springs will vary depending on their location on the frame: the compression of those springs acting on the upper segments will be greater than that of the springs of the lower segments since gravity further assists the lower segments in their retracting movement.

In the operation of the vulcanizer 34, cylinders 112 and 114 are actuated so that their piston rods 116 and 118 cause the drawing together of blocks 126 and 128. It is to be noted that the reaction of the cylinders is taken up on the upper surface 162 of the upper block 130 where the lower extremities 164 and 166, respectively, of spacer tubes 120 and 122 find support. The compressing of chains 134 and 136 forces the mold segments 137 to 143 to radially move inwardly in core 101 until they come into abutment with each other to define a circular contiguity. Subsequently, the segments are returned to their original positions; the tension in the chains is released and each segment is radially moved outwardly under the action of spring means 146 and gravity, as explained above.

Referring to FIGS. 2, 6 and 12 of the drawings, drum 50 consists of a rigid hollow cylindrical frame 201 with front and rear sidewalls 200 and 202, each provided with a series of similarly shaped openings 204 which lighten the drum and enable inspection of the inner portion thereof; a series of steam or water receiving channels 206 is provided on the inner peripheral surface of the drum for track heating and cooling purposes and includes an inlet port 208 and an outlet port 210 on the front sidewall 200 thereof for connecting the channels to heating and cooling stations. The frame of drum 50 is rigidly circular and must be of strong construction to support radially exerted forces applied thereon by the mold segments 137 to 143; a pair of reinforcing annular flanges 207 disposed between the channels 206 are provided for this purpose. Referring more particularly to FIGS. 6 and 12, the outer periphery of the frame is provided with a chain 212, or the like, fixed along the edge adjacent the rear sidewall 202.

Figure 8:
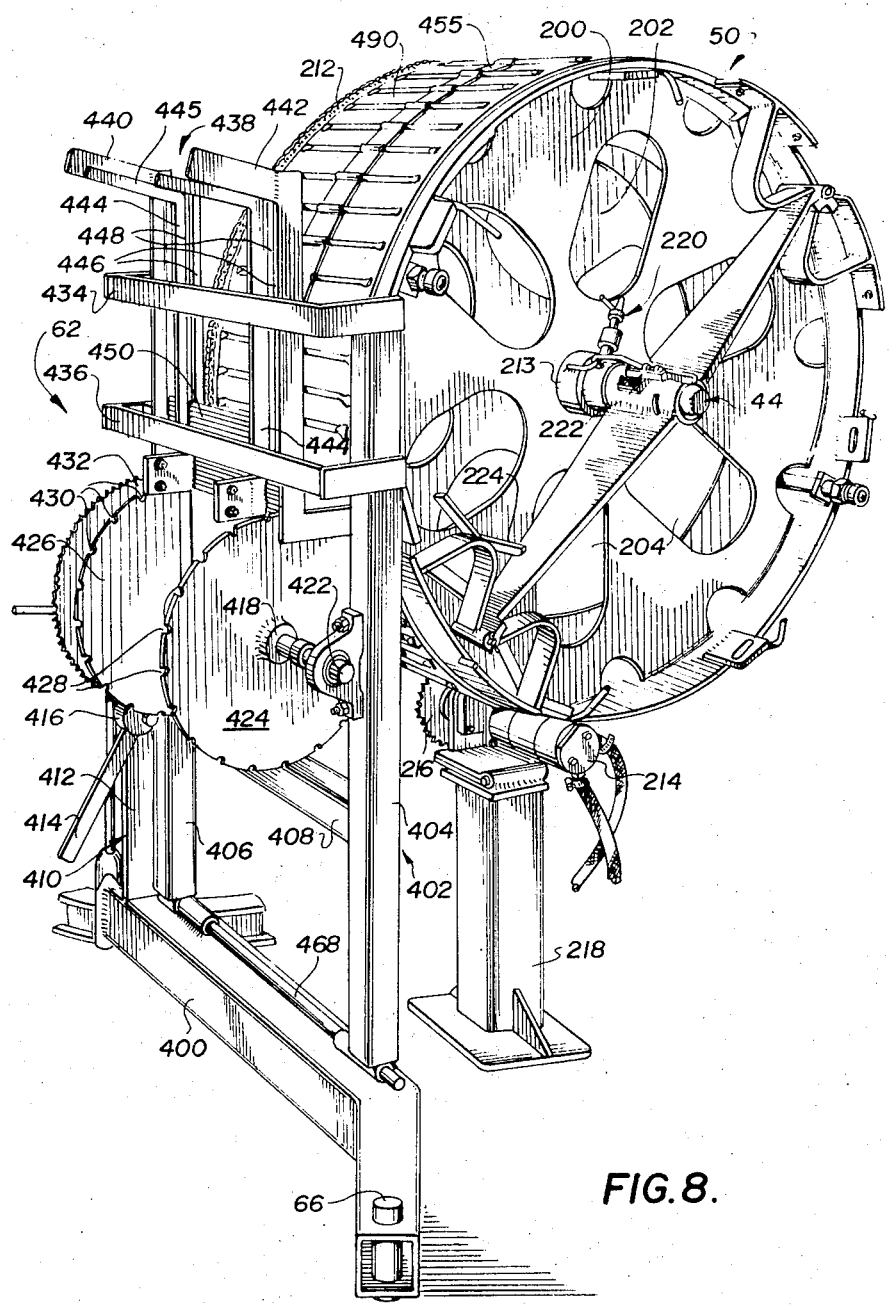
FIG. 8 is a perspective view of the rod applicating device and drum of the present apparatus.
Figure 9:
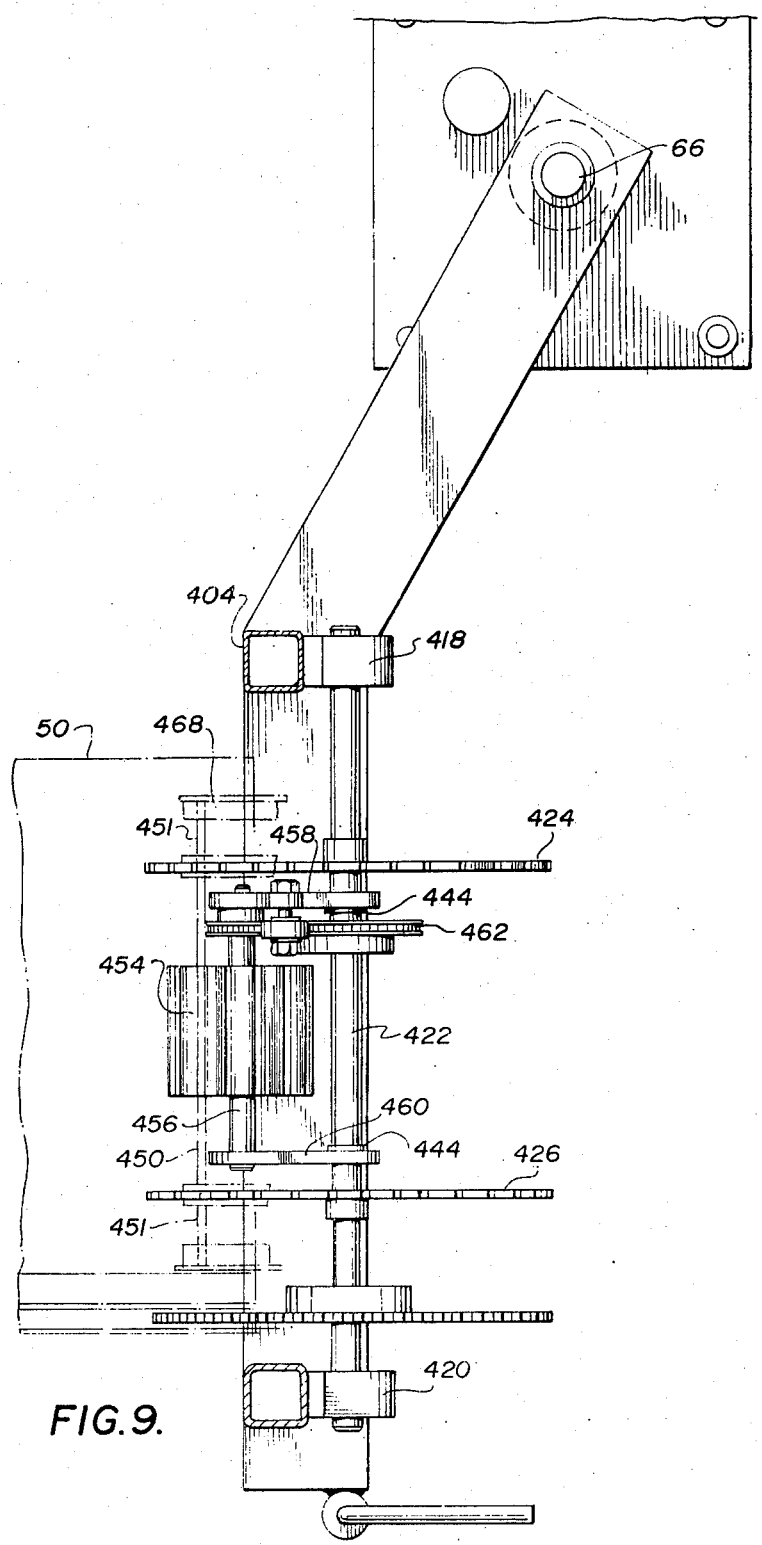
FIG. 9 is a plan view of the rod applicating device.

The frame is provided with a hub centrally disposed thereon and, as illustrated in FIG. 8, one of the shafts 44, 46 or 48 of the turret 42 is received therethrough to support the drum over a stand 218 on which is mounted a motor 214 adapted to drive a sprocket gear 216. The latter engages the chain 212 and rotates the same in the opposite rotational direction.

Figure 4:
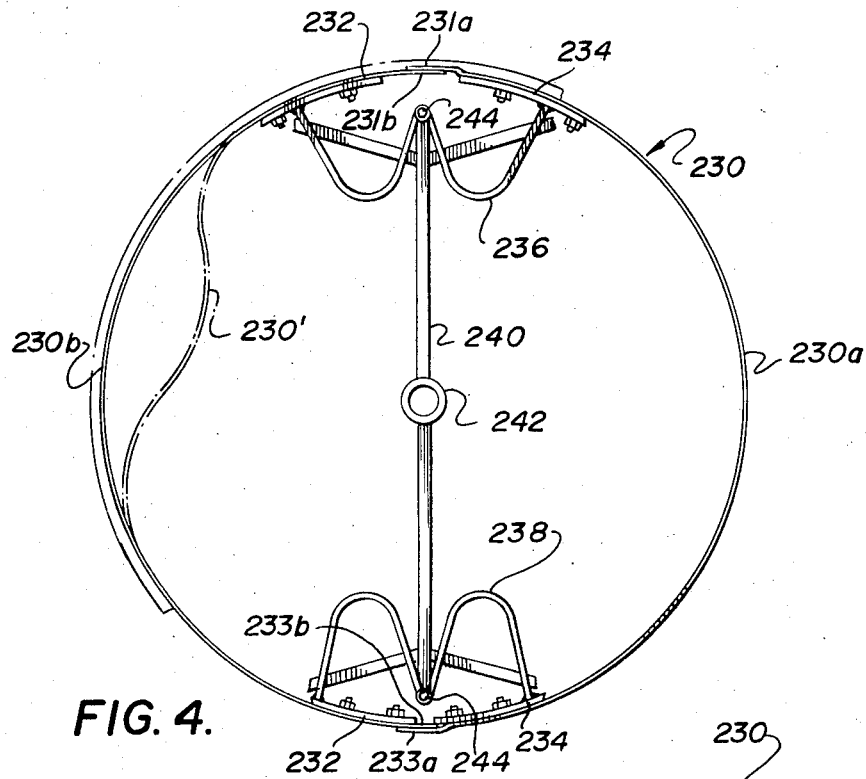
FIG. 4 is a front elevational view of the sleeve member of one drum of the present apparatus showing in broken lines one part of the sleeve member being inwardly flexed.
Figure 5:
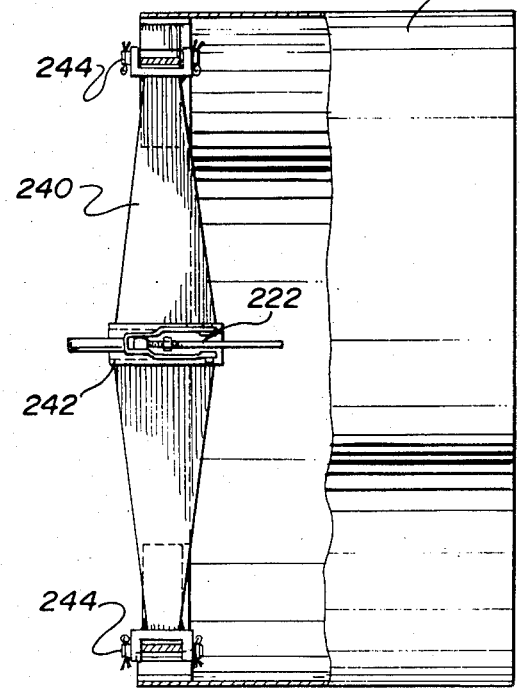
FIG. 5 is a side elevational view, partly cross-sectional of the sleeve member shown in FIG. 4.

Referring to FIGS. 4, 5, 6 and 8 of the drawings, the drum 50 further includes a flexible sleeve 230 adapted to come into circumferential engagement with the outer periphery of frame 201. The sleeve 230 is made of a thin metal sheet with at least one transverse split defining overlapping edges. FIG. 4 shows two diametrically opposed splits defining overlapping edges 231a, 231b and overlapping edges 233a, 233b; the splits divide the sleeve in two portions 230a and 230b which are interconnected by means of a pair of M-shaped members 236 and 238 having their ends welded to a pair of extensions 232 and 234 projecting outside the periphery of the sleeve member. Members 236 and 238 are flexible guides which enable the adjusting of the sleeve portions relatively to one another; these flexible guides are connected to a central hub 242 by means of a diametrical plate 240. It is to be noted, however, that each end of plate 240 is connected to members 236 and 238, respectively, by means of a pivot 244 so that members 236 and 238 may rotate relative to the plate 240 when the sleeve is inwardly flexed (as indicated by numeral 230') to remove a cured track therefrom as hereinafter described. Without the aid of such a pivot, the sleeve would shear after a certain number of operations.

During the preparation of a new track, the sleeve is locked to the drum and the latter is locked to the shaft of the turret; these parts are thereby prevented from rotating. As shown in FIG. 6, a lock mechanism 220 secures the drum 50 on shaft 44 while a second lock mechanism 222 (FIG. 8) secures the sleeve 230 on the drum 50. In addition thereto, a guide provides an indication for the angular position of the sleeve relative to the drum; this guide is a V-shaped plate 224 welded to sidewall 200 of drum 50 and in which the diametrical plate 240 may be received.

Referring to FIGS. 1 and 12, the turret 42 includes a circular base 260 which is rotatably mounted on a vertical post 262 by means of collars 263 and a vertical support 264. Mounted peripherally on base 260 and disposed thereon at 120° angles are three vertical supports 266, each support being rigidly fixed to the support 264 by means of a horizontally extending bar or iron angle 268. A pair of collars 276 and 278 are fixed on the top of each of the three vertical supports 266 and support a sleeve 274 slidably receiving a shaft therein, such as shaft 44 as shown in FIG. 12. The end 271 of shaft 44 is also slidable on a rod secured at one end to a vertical iron angle 270; a spring 272 surrounds the rod and absorbs any force exerted by shaft 44 towards member 270. Also fixed to base 260 are a series of inverted L-shaped locating rods, such as rod 280, which may be moved in and out of a locating block 284 fixed to the floor structure 286. These blocks 284 are set at predetermined locations around the turret base 260; the locations correspond to different positions at which the turret must be fixedly set during the different steps of the operation. A plate 288 is fixed over the vertical supports 270 for receiving tools used during the application of the layers of rubber and nylon fabric and of the rods on the sleeve of the drum. Shaft 44, as well as shafts 46 and 48, have a portion 290 which is adapted to be received in the hub portion 213 of the frame 201 and a second portion 292 which is adapted to be received in the hub portion 242 of the sleeve 230. Shaft 44 further includes an end portion 296 which slightly emerges out of hub 242.

The operation of the turret will later be described in conjunction with the method of making the tracks.

Referring to FIGS. 1, 6 and 7, the belt extracting device 68 includes a base 300 which supports a horizontally disposed cylinder 302 pneumatically or otherwise actuated through appropriate pipe means 304. The cylinder operates a spindle 70, the head portion 72 of which is provided with a hollow portion 309 with a slot 310 extending through the surface thereof. The hollow portion 309 is adapted to fit over end portion 296 of shaft 44 and in hub portion 242 of sleeve 230. A key 74 attached to head portion 308 by means of chain 320 has a V-shaped clip portion 322 which is inserted in slot 243 of hub portion 242 and slot 310 of the head portion 74 to seize the restricted neck portion of the end portion 296 of shaft 44 to thereby effect a locking inter-engagement between the sleeve 230, the shaft 44 and the extracting device 68.

Once a track has been cured and cooled, as it will hereinbelow be described, the drum 50 is brought adjacent the belt extracting device 68; spindle 70 is pneumatically operated so that its head portion 72 is extended to be received in the hub portion 242 of the sleeve 230. Key 74 is inserted in the appropriate slots and the spindle is retracted back in cylinder 302; in so doing, shaft 44 and sleeve 230 are moved toward the base 300 and sleeve 230 thereby slides off the drum with the cured and cooled track thereon. By inwardly flexing the sleeve 230 (FIG. 4), the track is separated from the sleeve. Cylinder 302 is again actuated to return the spindle, sleeve and shaft assembly so that the sleeve may be re-positioned on the outer periphery of frame 201. It is to be noted that, due to the considerable pressure exerted by the segments on the track during the vulcanizing process, sleeve 230 has a tendency to adhere to the outer surface of the drum; the adherence force between both components may, in some cases, reach 15,000 pounds. A bar 314 is therefore used, having an end connected to the extractor assembly 68 and the other end applied against the sidewall 200 of the drum, to assist in the retracting of the sleeve 230 off the drum 50 and also to prevent the drum from following the retracting movement.

Figure 10:
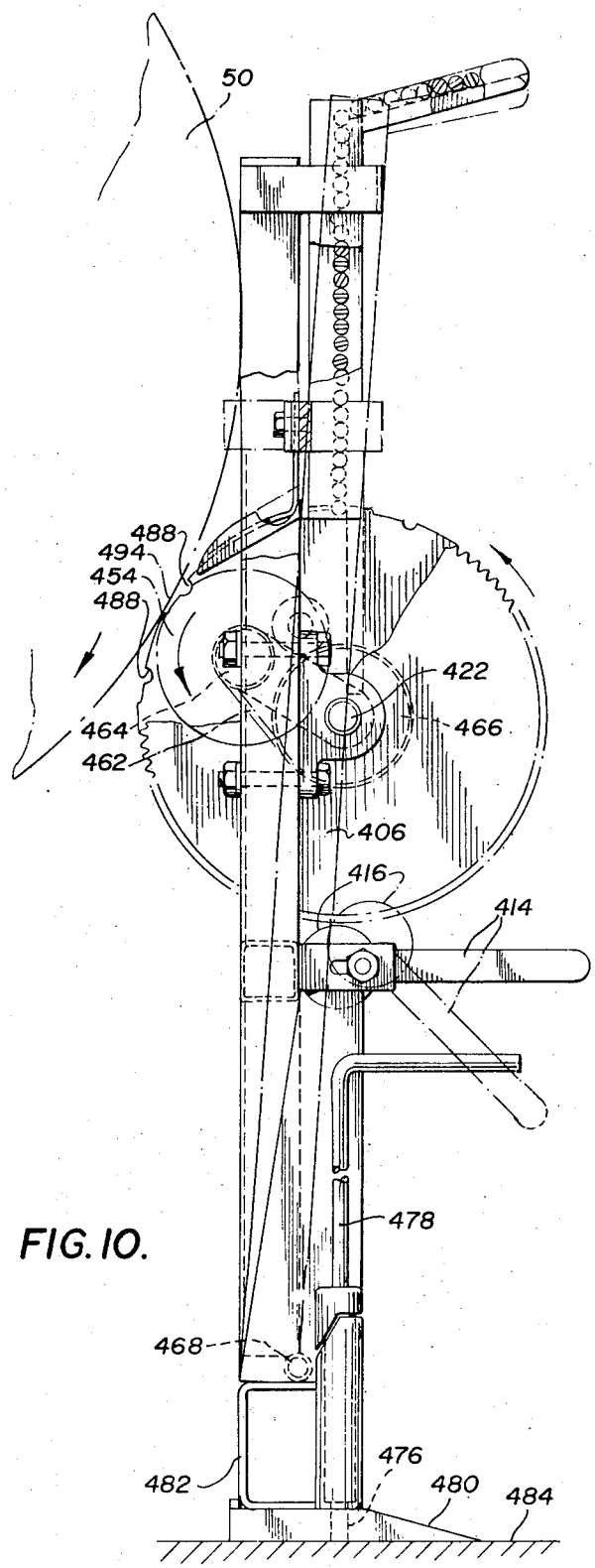
FIG. 10 is a side elevational view of the rod applicating device showing two positions of the device in relation to the drum.
Figure 11:
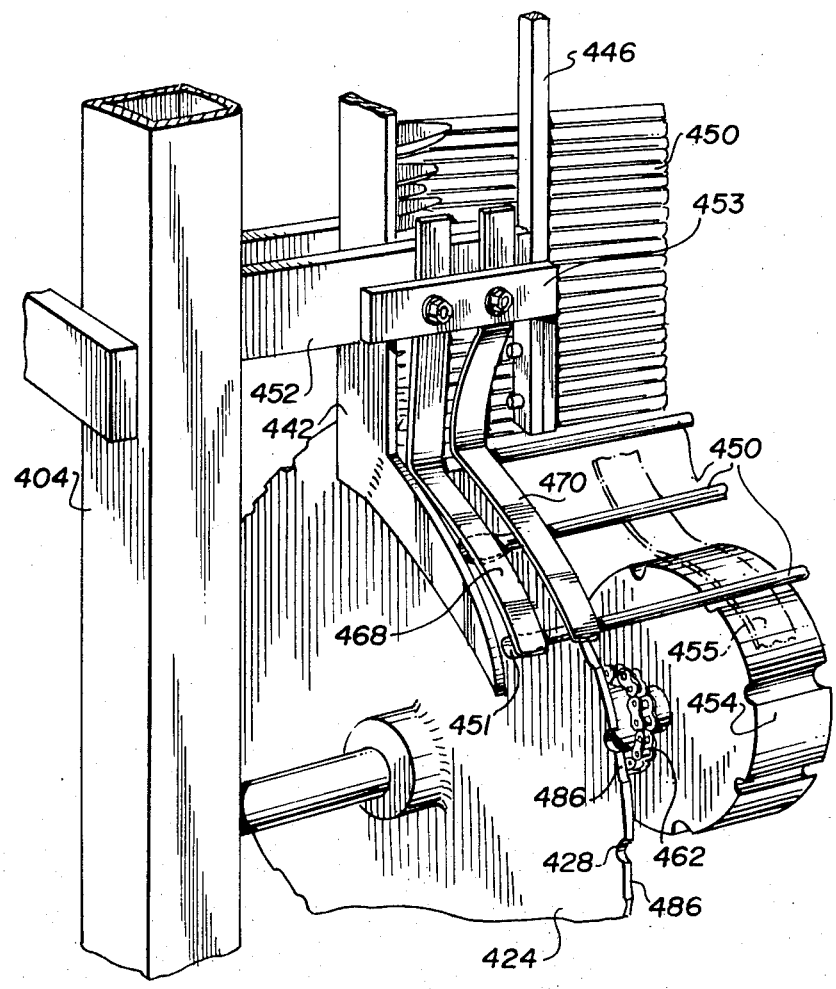
FIG. 11 is an enlarged perspective partial view of the r0d stacking means, collecting means and transferring means of the rod applicating device.

Referring to FIGS. 8, 9, 10 and 11 of the drawings, the rod applicating device shown as 62 in FIG. 1 includes a base support 400 which is pivotable at one end thereof about pin 66 and to which is welded the lower end of a frame 402 consisting of two vertical supports 404 and 406 cross-braced by a horizontal support 408. A vertical plate 410 is also fixed to the base 400; to the side surface 412 thereof is mounted a lever 414, one end of which has a cam surface 416 bearing against one side surface of the vertical support 406. A pair of bearing members 418 and 420 are respectively secured to members 404 and 406 and rotatably support shaft 422 on which is secured for rotation therewith a pair of spaced-apart discs 424 and 426, respectively, provided with a series of grooves 428 and 430 equally distanced on the periphery thereof, each groove of one disc being in alignment with a corresponding groove on the other disc. Also secured on shaft 422 for rotation therewith is a sprocket disc 432 adapted to engage with the chain 212 of the fabric covered drum 50. Welded or otherwise secured to vertical members 404 and 406 are the extremities of two vertically spaced-apart U-shaped members 434 and 436 which support a rod receiving and stacking device 438. The device consists of a pair of parallel Z-shaped guiding members 440 and 442 fixed to the horizontal bars 434 and 436 and of two laterally spaced sets of vertical bars 444 and 446 slightly distanced from one another, each set defining a channel 448 therebetween in which a plurality of rods 450 are received and stacked; bars 446 are connected to their respective vertical supports such as exemplified in FIG. 11 wherein bar 446 is connected to support 404 by means of a cross-member 452. Disposed between discs 424 and 426 (FIG. 10), a transversely grooved drum 454 is secured on a shaft 456 which finds support at its opposite ends on a pair of plates 458 and 460 receiving shaft 422 and held by members 444. Shaft 456 and shaft 422 are interconnected by means of a chain and sprocket arrangement consisting of a chain 462 engaging sprocket gears 464 and 466 respectively mounted on each shaft. Referring to FIG. 11, cross-member 452 carries, by means of appropriate securing means 453, a pair of L-shaped resilient members 468 and 470; the lower end of member 468 is adapted to contact the flattened ends 451 of rods 450 while the lower end member 470 is adapted to maintain the rods 450 in the grooves 428 of disc 424. Similar resilient members are provided on the other lower end of the rod receiving and stacking device 438 to contact the opposite ends of the rods and to maintain them in the grooves 430 of the disc 426 (see FIG. 9). Referring more particularly to FIGS. 8 and 10, the frame 402 is mounted on base 400 in such a way that the frame may be pivoted about a pin 468 which extends through the lower end of supports 402 and 404. When the rod applicating device 62 is brought adjacent the fabric covered drum 50, the exact positioning of drum 454 relative to and against drum 50 is effected by raising lever 414 in such a way that the cam surface 416 forces the frame 402 to pivot about shaft 468 so that drum 454 may be moved against drum 50.

In operation, the rod applicating device is brought adjacent the drum 50 which has been previously covered with layers of rubber and nylon fabric and then coated with an adhesive; the lower end 476 of a positioning bar 478 slides up the inclined surface 480 of a positioning block 482 fixed to the floor 484 and then drops in a suitable opening in the block 482. Then, lever 414 is raised so that the drum 454 may be moved, as explained above, in the exact position in relation to the drum 50. A number of rods 450 are placed on the inclined upper receiving portions 445 of members 444 where they individually slide in channel 448 and are stacked in a vertical position, the lowermost rod taking position on the periphery of discs 424 and 426. Motor 214 is driven to rotate gear 216 which engages the chain 212 and causes rotation of the drum 50. The chain 212 engages sprocket disc 432 which in turn rotates shaft 422 and discs 424 and 426. Rotation of these discs causes the lowermost rod to slide on the periphery of the discs until it falls in grooves 428 and 430; recesses 486 are provided adjacent each groove of each disc to assist in the sliding of each rod 450 in grooves 428 and 430. As each rod approaches the ends of resilient members 468 and 470, the middle portion of the rod is received in the vicinity of the transverse grooves 488 of drum 454 where a strip of rubber 455 is received from a spool (not shown) located near the device. In order that the transfer of the rod from the discs 424 and 426 onto the drum 50 be accurately effected, it is necessary that the discs and drum 454 have a common tangent plane at a point; in this particular case, the meeting point is substantially at 494 in FIG. 10. Drum 454 rotates counterclockwise while drum 50 rotates clockwise; the transfer and holding of the rod on the adhesive-coated fabric 490 is effected by the adhering of the rubber strip 455 to the fabric.

The apparatus of the present invention provides the manufacturer of a snowmobile track with a reduction of labour and of operation. The apparatus also permits an arrangement of these components in such a way that the number of tracks made per man-hour can be augmented in relation to those made with prior machines. As mentioned above and with reference to FIG. 1, a second station 52 may be set up adjacent the turret and on which a second vulcanizer 54 may be placed. With reference to FIGS. 13–17, a detailed description of the series of steps performed in the making of a snowmobile track in accordance with the present invention, will now be described.

The first step in making snowmobile type tracks in accordance with the present invention, consists in laying on the sleeve of a drum 50 a first layer of rubber and nylon fabric; then, the rod applicating device 62 is pivoted and set adjacent the drum 50 so that a series of rods (for example 58) may be successively placed at equal intervals on the fabric and held in place between a strip of rubber fabric and the previously wound layer of fabric (see FIG. 8). A second layer of rubber and nylon fabric is placed over the strip and the rods and a non-cured track is thus prepared on the drum. The turret 42 is then rotated (see FIG. 13) so that drum 50 will face the first station 32 where vulcanizer 34 will be moved to the right to receive the drum therewithin and then retracted toward the left to its original position where appropriate steam conduits are connected to the inlet and outlet ports 208 and 210 of the drum. Cylinders 112 and 114 are operated causing chains 134 and 136 to compress the mold segments on the track. While the track is being cured, a second drum 50' (see FIG. 14) supported on shaft 46, is prepared in a similar fashion as that explained above for drum 50. When prepared, the second drum 50' is brought adjacent the second station 52 where vulcanizer 54 is moved to the left to receive the drum 50' and then retracted to its original position. While the tracks on drums 50 and 50' are being cured, a third track is being prepared on drum 50'' (see FIG. 15).

When the track of the first vulcanizer is cured, drum 50 is then placed back on shaft 48 of the turret, the vulcanizer 34 is retracted and the turret 42 is rotated so that the third drum 50'' is brought to station 32 where it is received in the vulcanizer 34. Turret 42 is then rotated back so that drum 50 is brought to the cooling station 88 (see FIG. 16) adjacent vulcanizer 34 where appropriate connection means such as conduits 90 and 92 are connected to the inlet and outlet ports 208 and 210 of drum 50. While the track on drum 50 is being cooled, a fourth drum 50''' is being prepared in a similar fashion as that for drums 50, 50' and 50''. Once the track on drum 50 is cooled, the cooling means are removed and the drum 50 is brought in alignment with the belt extracting device 68 where the track is removed off drum 50 (see FIG. 17). Therefore, during full operation of the track-making apparatus, there are two drums being received in the two vulcanizers and two drums supported on two of the three shafts of the turret 42; one of the two latter drums is at the cooling station 88 and the other one is at the station where a new track is being prepared. Once the track is prepared, the following steps are followed with reference to FIG. 16:

1. the cooling circuit at 88 is removed;
2. turret 42 is rotated in a direction such that shaft 44 which was free comes in proximity of the vulcanizer 54 which is near the end of its cycle (the operations of the vulcanizers are dephased by 180°);
3. the vulcanizer is rolled toward the turret 42 for engaging the shaft of the turret in the hub of the drum;
4. the steam supply is removed and the pressure on the chains is relieved to enable the retracting of the segments;
5. the vulcanizer is returned to its original position;
6. the turret is rotated so as to bring the drum 50''' with an uncured track in the vicinity of the empty vulcanizer;
7. the drum 50''' is received in the vulcanizer 54, the steam conduits are connected to the drum and the cylinders are actuated to compress the chains on the segments;
8. the turret is again rotated until the drum 50' with the cured track thereon is brought to the cooling station;
9. the cooling conduits are connected while the cured track on drum 50 which has just left the cooling station is disposed adjacent the extracting device 68;
10. this cooled and cured track is removed off the drum 50 and sent for flashing removal and sprocket-hole piercing;
11. a new track is prepared on this drum 50; then, a cycle similar to steps 1-11 described above is repeated with the exception that this new drum will be rotated to the other vulcanizer 34 which is terminating its curing cycle.

It is well within the scope of the present apparatus to provide a third vulcanizer without altering the present set-up; such an apparatus would only require a fifth drum and also require that the track preparation does not exceed a third of the curing time.

Although the invention has been described above only in relation to one specific form of the invention, persons skilled in the art will be aware that it may be refined and modified in various ways without departing from its scope. It is therefore wished to have it understood that the present invention is not limited in interpretation except by the terms of the following claims.

The embodiments of the invention in which an exclusive property or privilege is claimed are defined as follows:

1. A method of making snowmobile-type tracks with a pair of vulcanizers movably mounted adjacent a rotatable turret carrying three horizontally extending shafts each capable of supporting a track-receiving drum, comprising the steps of: preparing on a first drum at a preparing station a first track constructed of rods and of layers of rubber and fabric, rotating said turret to place said first drum adjacent a first vulcanizer and removing the first drum from its turret shaft while placing said first drum in said first vulcanizer for curing said first track; preparing on a second drum at said preparing station a second similarly constructed track, rotating said turret to place the second drum adjacent a second vulcanizer and removing said second drum from its turret shaft to place said second track in said second vulcanizer for curing said second track; preparing on a third drum at said preparing station a third similarly constructed track; rotating the turret to remount the first drum on the turret shaft on which it was originally mounted, and rotating the turret to place the third drum adjacent said first vulcanizer and removing said third drum from its turret shaft to place it into said first vulcanizer for curing said third track; rotating said turret to place said first drum adjacent a cooling station for cooling said first track; and preparing on a fourth drum a fourth similarly constructed track.

2. A method as defined in claim 1, further comprising the steps of rotating said turret to move said first drum from said cooling station to a position adjacent a track-extracting device; removing the cooled track from said first drum; moving said second vulcanizer to remove said second drum from said second vulcanizer and remounting it on the shaft on which it was originally mounted; rotating said turret to place said second drum adjacent said cooling station; cooling said second track; and preparing on said first drum from which said cooled cured track has been removed, said fourth similarly constructed track.

3. An apparatus for making snowmobile-type tracks comprising, in combination, a rotatable turret carrying at least three horizontally extending shafts disposed equiangularly about the turret axis, each shaft including means for supporting an endless track receiving drum centrally thereof; at least two vulcanizers mounted adjacent said turret and being movable towards and away from the turret axis, each of said vulcanizers having a hollow core means for receiving a drum therein to cure the endless track, an automatic rod applicating device disposed adjacent said turret and adapted to come in circumferential abutment with a track-covered drum to thereby transfer and fix transversely thereon a series of rods.

4. An apparatus as defined in claim 3, further comprising heating and cooling stations including conduits for connecting with said drum and for circulating in said drum a heating or cooling medium.

5. An apparatus as defined in claim 4, further comprising a track extracting device disposed adjacent said turret and having a movable spindle adapted to be connected with a track-covered drum to retrack said track from said drum.

6. An apparatus as defined in claim 5, wherein there are three turret shafts and two vulcanizers, and comprising four track-covered drums, two of said drums being received in said vulcanizers, a third drum being positioned at a cooling station and the other drum being positioned adjacent said track extracting device.

7. A vulcanizer for making snowmobile type endless tracks comprising a frame having a hollow core adapted to receive therein a drum whose outer periphery has been covered with layers of nylon and rubber fabric; a series of arc-shaped mold segments, each segment having an outer surface and an inner mold surface, said segments being supported by said frame and being disposed in circular alignment in said core, said segments being radially movable in circumferential abutment to form a contiguous mold surface having a predetermined tread design; chain means encirling the outer surfaces of said segments, said chain means having one end fixed in a first chain support member movably mounted on said frame and the other end fixed in a second chain support member movably mounted on said frame and means for moving at least one of said chain support members drawing said chain means tight about the segments to restrict said chain means on said outer surfaces of said segments to radially move said segments into circumferential abutment.

8. A vulcanizer as defined in claim 7, wherein said chain means comprises a pair of laterally spaced-apart chains, each chain having an intermediate portion connected to one of said segments disposed diametrically opposite said chain support members; and wherein said drawing means comprises a pair of hydraulically operated cylinders, each cylinder being operatively connected with one of said pair of chains.

9. A vulcanizer as defined in claim 8 wherein each segment is provided with spring-biased means having one end portion fixed in said frame for returning said segments from their circumferential abutment into a spaced-apart circular alignment.

10. A vulcanizer as defined in claim 9 wherein said frame includes a plurality of leg portions, each provided with wheels, whereby said vulcanizer may be brought in surrounding engagement with said drum; and wherein said series consist of seven mold segments.

11. A drum for use in an apparatus for making snowmobile-type endless tracks comprising, in combination, a rigid hollow cylindrical frame having front and rear sidewalls; and a flexible thin sleeve member positionable into circumferential engagement with the outer periphery of said frame, said sleeve including adjustment means for adjusting the circumferential length of the device, said adjusting means including at least one transverse split defining radially overlapping edges, resilient means interconnecting the sleeve member on opposite sides of the split for resiliently urging the edges of the split together into said overlapping relationship while permitting resilient separation thereof, and an axial support means including a hub portion on the axis of the sleeve and connecting means for interconnecting the hub portion and the flexible thin sleeve member.

12. A drum as defined in claim 11 wherein said sleeve member includes two diametrically disposed transverse splits with overlapping edges; said connecting means including a diametrically extending plate fixed to said hub portion, said resilient means comprising flexible guides pivotally mounted at opposite ends of said plate and having their ends fixed to said sleeve member and inter-connecting the overlapping edges thereof.

13. A drum as defined in claim 12 further comprising chain means peripherally mounted on said outer periphery of said frame along the edge adjacent to said rear sidewall.

14. A drum as defined in claim 13 wherein channels are provided on the inner periphery of said frame for successively heating and cooling the cylindrical frame; and inlet and outlet means are provided on the front sidewall of said frame for connecting said channels to heating and cooling stations.

15. A drum as defined in claim 14 wherein said sleeve member is slidable on and off the outer periphery of said frame along the edge adjacent said front sidewall and opposite the edge receiving said chain means.

16. A rod applicating device for use in an apparatus for making snowmobile-type endless tracks, comprising a frame adapted to be pivoted adjacent a fabric covered drum of said apparatus; a rod receiving and stacking means on said frame for holding a plurality of rods substantially in vertical arrangement; rod collecting means disposed underneath said stacking means on said frame and having a series of recesses positioned to receive therein the lowermost rod of said plurality of rods; and a transfer drum disposed adjacent said collecting means, means for delivering an elastomeric strip onto the transfer drum, said transfer drum having means thereon for transferring said rods from the collecting means onto the fabric-covered drum while concurrently laying said strip over the rods on the drum.

17. A rod applicating device for use in an apparatus for making snowmobile type endless tracks, comprising a pivotable frame adapted to be brought into proximity of a fabric-covered drum of said apparatus, a rod receiving and stacking means on said frame for holding a plurality of rods in vertical arrangement; a pair of rod-collecting discs rotatable together and pivotally mounted on said frame and disposed underneath said stacking means, each of said discs having on the periphery thereof a series of spaced-apart recesses, each recess being aligned with a recess on the other disc to form an aligned pair of recesses each of said pair being positioned to receive opposite end portions of the lowermost rod of said plurality of rods; and a rotatable transfer drum pivotally mounted on said frame between said pair of discs, means for delivering an elastomeric strip onto said drum, said drum being provided with circumferentially spaced-apart grooves extending on the periphery thereof for transferring said rods from the collecting discs onto the fabric-covered drum while concurrently laying said strip over said rods on the drum.

18. A rod applicating device as defined in claim 17, wherein said transfer drum and said discs have a common tangent plane at a point, said point generally corresponding to that where the rod is transferred from said discs to said drum.

19. A rod applicating device as defined in claim 18, wherein said pair of discs are secured on a common rotatable shaft and wherein said transfer drum is secured on a second rotatable shaft operatively connected with said common shaft; said device further comprising a sprocket gear secured on said common shaft and adapted to engage a chain peripherally mounted on the fabric-covered drum whereby the rotation of said discs and said transfer drum is effected by the rotation of the fabric-covered drum.

20. A rod applicating device as defined in claim 19, further comprising means for adjusting the relative position of said transfer drum relatively to the fabric-covered drum and means for fixing said frame in adjusted position relative to the fabric-covered drum.

* * * * *